United States Patent [19]

Kitamura et al.

[11] Patent Number: 4,910,671

[45] Date of Patent: Mar. 20, 1990

[54] DATA PROCESSING SYSTEM HAVING A PERFORMANCE CONTROL PULSE WITH A VARIABLE DUTY CYCLE FOR CONTROLLING EXECUTION AND NON-EXECUTION OF INSTRUCTIONS

[75] Inventors: Toshiaki Kitamura, Tokyo; Kazuyuki Shimizu, Machida; Yuji Oinaga, Tokyo; Katsumi Onishi, Kawagoe, all of Japan

[73] Assignee: Fujitsu Limited, Kawasaki, Japan

[21] Appl. No.: 844,946

[22] Filed: Mar. 27, 1986

[30] Foreign Application Priority Data

Mar. 29, 1985 [JP] Japan .................................. 60-65809

[51] Int. Cl.⁴ .......................... G06F 9/28; G06F 9/30
[52] U.S. Cl. ................................. 364/200; 364/264.5; 364/270.2
[58] Field of Search ... 364/200 MS File, 900 MS File

[56] References Cited

U.S. PATENT DOCUMENTS

| | | | |
|---|---|---|---|
| 4,191,998 | 3/1980 | Carmody | 364/200 |
| 4,208,724 | 6/1980 | Rattligourd | 364/900 |
| 4,366,540 | 12/1982 | Berglund et al. | 364/200 |
| 4,414,637 | 11/1983 | Stanley | 364/200 |
| 4,447,870 | 5/1984 | Tague et al. | 364/200 |
| 4,458,308 | 7/1984 | Holtey et al. | 364/200 |

FOREIGN PATENT DOCUMENTS 2295487 7/1976 France .

0109937 9/1983 Japan .................................. 364/200
0175732 8/1986 Japan .................................. 364/200

OTHER PUBLICATIONS

Patent Abstracts of Japan, vol. 7, No. 216 (P-225) [1361], Sep. 24, 1983; & JP-A-58 109 937 (Fujitsu K.K.) 06-30-83.

European Search Report, The Hague, 04-26-88.

D. W. Anderson et al.: "The IBM System/360 Model 91: Machine Philosophy and Instruction-Handling"; IBM Journal, Jan. 1967, pp. 8-24.

James W. Rymarczyk et al.: "Coding Guidelines for Pipelined Processors" Proceedings Symposium on Architectural Support for Programming Languages and Operating Systems; Mar. 1-3, 1982, pp. 12-19.

*Primary Examiner*—Archie E. Williams, Jr.
*Assistant Examiner*—Ayni Mohamed
*Attorney, Agent, or Firm*—Staas & Halsey

[57] ABSTRACT

A system for adjusting a performance of an information processing apparatus which provides a unit indicating a target performance value, a unit generating a corresponding performance control pulse in accordance with the target performance value, and an execution control unit which alternately sets an execution period and an execution inhibiting period in accordance with the performance control pulse. The unit which generates the performance control pulse makes a ratio of a pulse width and a pulse period of the performance control pulse coincide with the target performance value.

5 Claims, 11 Drawing Sheets

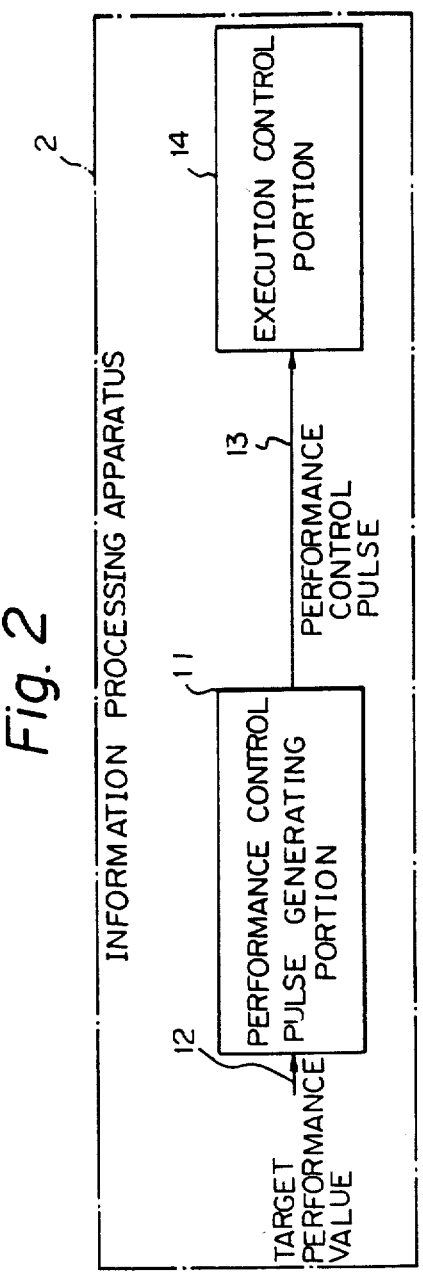
Fig. 2
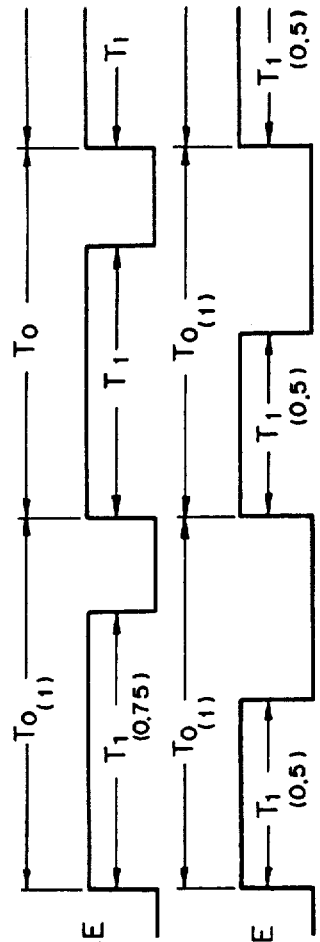
Fig. 3A
TARGET PERFORMANCE
VALUE = 0.75
Fig. 3B
TARGET PERFORMANCE
VALUE = 0.5

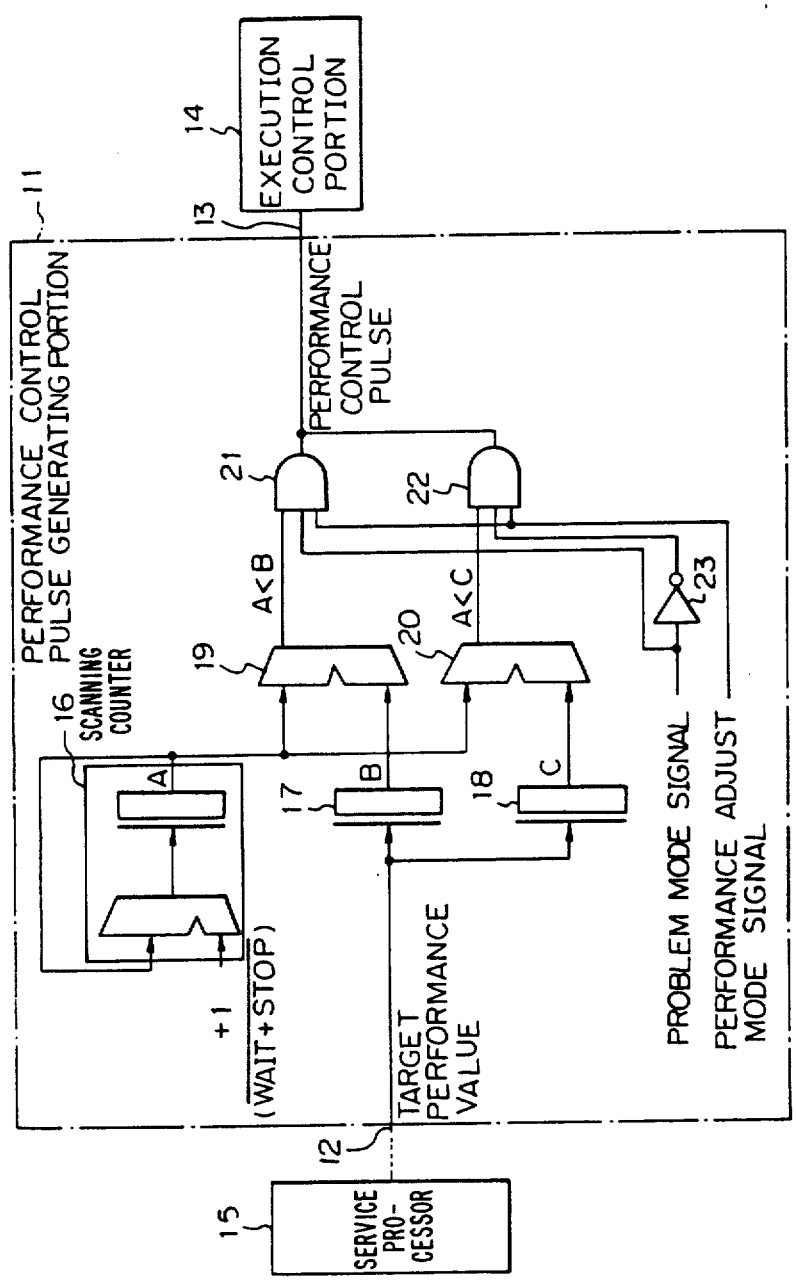

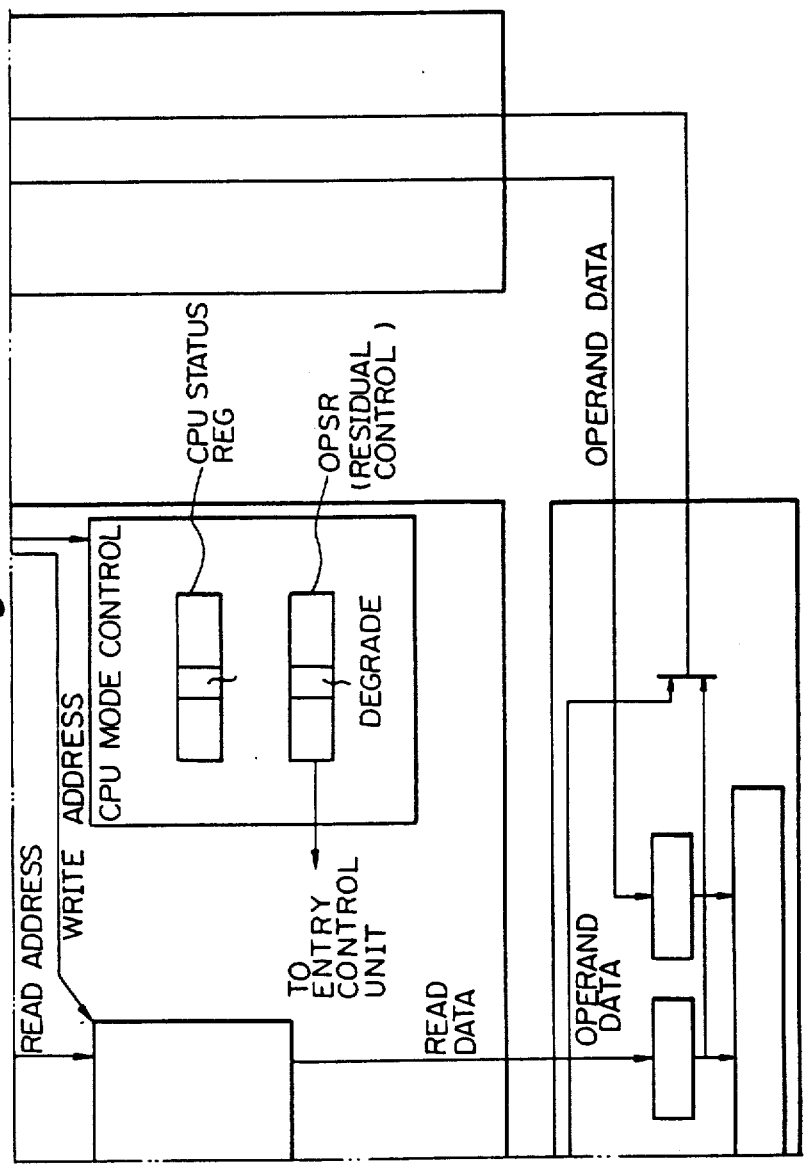

```
            D A T B E W
            D A T B E ······· W
(FOR EXAMPLE) D A T B ········ E W
  REQUEST TO  ├──────┐ REPLY FROM CHP
     CHP             └─► D A T ···· \···B E W
                                    CAN NOT RECEIVE
              D A ········ T B E W
              D ········ A T B E W
```

Fig. 8C

```
            D A T B E W
            D A T B E W
(FOR EXAMPLE) D A T B E W
  REQUEST TO  ├──────┐ REPLY FROM CHP
     CHP             └─► ··► CAN RECEIVE
              D A T B E W
              D A T B E W
              D A A A A A T B E W
              D D D D D A T B E
```

DATA PROCESSING SYSTEM HAVING A PERFORMANCE CONTROL PULSE WITH A VARIABLE DUTY CYCLE FOR CONTROLLING EXECUTION AND NON-EXECUTION OF INSTRUCTIONS

BACKGROUND OF THE INVENTION

1. Field of the Invention

The present invention relates to an information processing apparatus and, more particularly, it relates to a control system for adjusting the performance of the information processing apparatus.

2. Description of the Related Art

In the typical information processing apparatus, the processing performance of the apparatus usually must be set to a predetermined target level. For example, a plurality of models forming one family must accomplish a plurality of different target performance goals. However, in such a case, if each model is designed and manufactured on an individual basis, the cost thereof is greatly increased. Therefore, in many cases, one information processing apparatus, having a high level of performance as a basic performance is prepared, and the various factors which affect the performance of the apparatus, such as processing speed, are adjusted with respect to the lower model prepared information processing apparatus. Thus an apparatus i.e., the models thereof, having a plurality of required target characteristics is obtained.

Many methods are used for adjusting the performance of the information processing apparatus. The main elements among these methods are shown below.

(1) Hardware Adjustment (a) Modification of buffer memory capacity

When the capacity of a buffer memory is modified, the condition at which a buffer miss or hit occurs may vary, and a frequency causing the buffer miss or hit may also vary, having an effect on the processing speed. This method is often utilized.

(b) Modification of degrees of a leading control

The manner in which instructions are packed in pipe lines or the degree for parallel processing is modified to cause a change in the processing efficiency.

(c) Utilization and non-utilization of a high speed operation mechanism

The speed of an arithmetic operation is changed by the addition or removal of an operation mechanism such as a high speed adder or a high speed multiplier.

(2) Microprogram Adjustments (a) Inserting a dummy step into a microprogram

By inserting a dummy step into a microprogram, the number of steps in which no operation is performed is increased, and thus the processing time can be extended.

(b) Inserting a dummy interlock

A code causing a dummy interlock during the processing of the pipe line is set in the microprogram.

In the conventional method for adjusting the performance of the device mentioned above, the desired target performance value cannot be absolutely guaranteed, and this causes a problem in that variances occur therein accordance with the system application circumstances. For example, in an application in which the amount of use of the buffer memory is originally low, if the capacity of the buffer memory is decreased, the processing time is not increased, and thus the performance is not degraded. However, in an application in which the amount of use of the buffer memory is high, if the capacity of the buffer memory is decreased, the processing time is suddenly increased, and a considerable degradation of the performance is caused. Further, in the method of inserting a dummy step, etc., into the microprogram, the microprogram is modified for each model. This causes a problem in that correction or management or maintenance of the microprogram becomes difficult. A further problem arises in that a larger capacity of the control memory is required more often in low order models.

SUMMARY OF THE INVENTION

An object of the present invention is to provide a system which can easily and precisely adjust the performance of the information processing apparatus to obtain a target performance value. In the present invention, an execution period and an execution inhibiting period, in which the execution is inhibited, are provided alternately, and a ratio thereof, that is, the ratio of the time usable for the execution to the total time, is made adjustable so that a desired target performance value can be set.

The present invention achieves this by providing a means for controlling the execution of the information processing apparatus by using a performance control pulse which indicates the execution period and the execution inhibiting period by an ON and OFF operation thereof, and a means for making a pulse duty ratio of this performance control pulse coincide with the target performance value.

Further features and advantages of the present invention will be apparent form the ensuing description with reference to the accompanying drawings to which, however, the scope of the invention is in no way limited.

BRIEF DESCRIPTION OF THE DRAWINGS

FIG. 2 is a block diagram showing the basic construction of the present invention;

FIGS. 3A and 3B are graphs illustrating waveforms of the performance control pulse according to the present invention;

FIG. 4 is a block diagram of one embodiment of the present invention;

FIG. 5 represents the arrangements of FIGS. 5A–5D;

FIGS. 5A–5D are block diagrams of the details of an embodiment of the present invention;

FIGS. 8A–8C are graphs and tables showing the instruction process produced by a degraded counter signal shown in FIG. 7.

DESCRIPTION OF THE PREFERRED EMBODIMENTS

Figure 1:
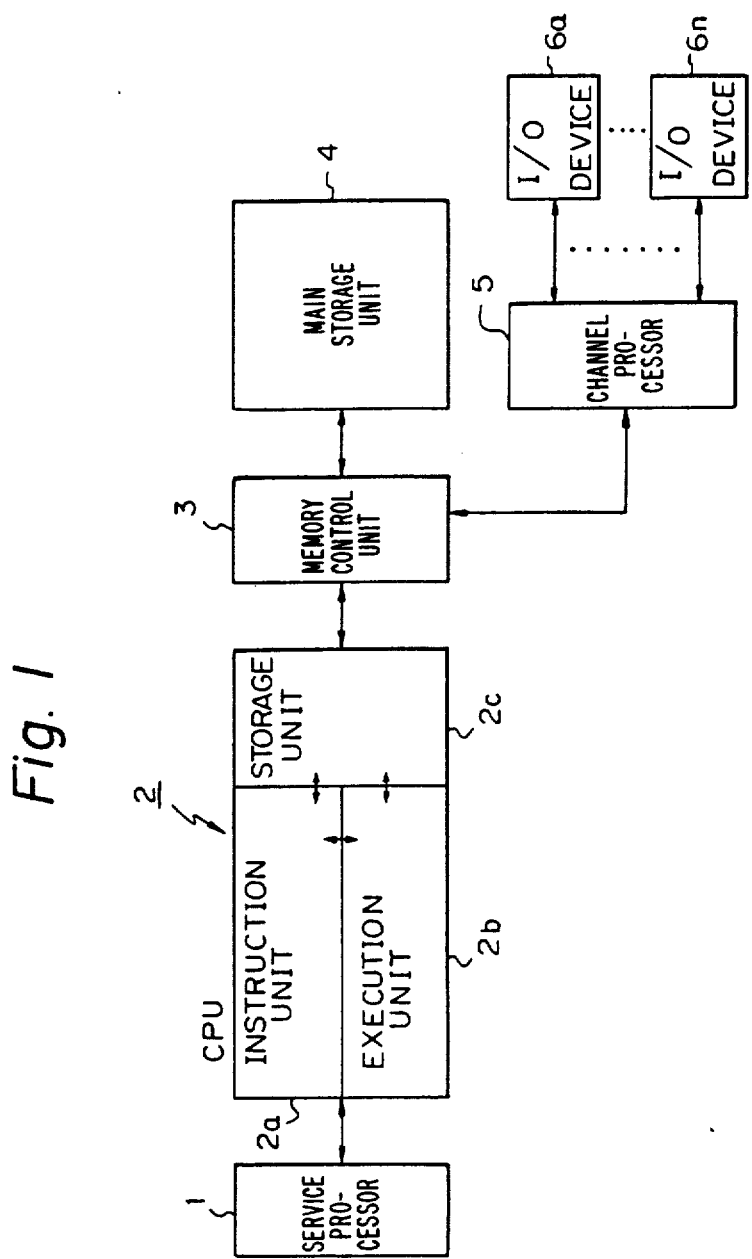
FIG. 1 is a block diagram of a conventional computer system to which the present invention is applied.

FIG. 1 is a block diagram of a computer system commonly used in industry. In FIG. 1, 1 designates a service processor, 2 designates a computer which includes an instruction unit 2a an execution unit 2b and a storage unit 2c. Item 3 designates a memory control unit, 4 designates a main storage unit, 5 designates a channel processor, and 6a, ..., 6n designate I/O devices. The present invention relates to the instruction unit 2a in the computer 2 of FIG. 1.

FIG. 2 shows the basic construction of the present invention, wherein 11 denotes a performance control pulse generating portion, 12 an input target performance value, 13 a performance control pulse, and 14 an execution control portion. The execution control portion 14 is allowed to process an instruction and to carry out a fetch operation for a next instruction only during the execution period (for example, during an ON period) indicated by the performance control pulse 13 output from the performance control pulse generating portion 11. The execution control portion 14 inhibited from processing the instruction and from carrying out the fetch operation for the next instruction during the execution inhibiting period (for example, during an OFF period). Therefore, when the execution inhibiting period occurs, the information processing apparatus is frozen in a state in which it maintains the state that it was in just before the execution inhibiting period occurred. When the execution inhibiting period is released, processing of the instruction is commenced from the maintained state.

FIGS. 3A and 3B show examples of the performance control pulses corresponding to various target performance values. FIG. 3A shows a performance control pulse generated when the target performance value is to be set at 0.75, setting the basic performance of the information processing apparatus to "1". That is, the ratio between the pulse period $T_0$ and the execution period $T_1$, i.e., the pulse duty is set at 0.75. FIG. 3B shows a similar performance control pulse generated when the target performance value is to be set at 0.5. Therefore, as shown in FIG. 3B, the ratio between $T_0$ and $T_1$ is set at 0.5. The target performance value is made to coincide with the pulse duty of the performance control pulse, and the actual operation enable period of the information processing apparatus is restricted, so that the information processing apparatus is adjusted to the desired target performance.

FIG. 4 is a block diagram of one embodiment of the present invention. In FIG. 4, 11 denotes the performance control pulse generating portion, 12 the target performance value, 13 the performance control pulse, 14 the execution control portion, 15 a service processor SVP, 16 a scanning counter, 17 a problem mode target value register, 18 a supervisor mode target value register, 19 and 20 comparators, 21 and 22 AND circuits, and 23 an inverter circuit.

The performance control pulse generating portion 11 sets the performance differently according to whether the information processing apparatus is in a problem program mode state or in a supervisor program mode state. This is because, if the performance is lowered uniformly in both mode states, the service for the user sometimes becomes extremely poor, and therefore, these modes should be suitably balanced.

When the information processing apparatus is not in a WAIT state or in a STOP state, the scanning counter 16 is counted up by every clock pulse, and when a full count is reached, the count up operation is repeated to continue the scanning operation. The problem mode target value register 17 and the supervisor mode target value register 18 are previously set to the performance target value desired in each mode state, by the service processor SVP 15. The comparators 19 and 20 constantly compare the values of the scanning counter 16 and the target value registers 17 and 18, and output the result of the comparison to the AND circuits 21 and 22.

When it is assumed that the value of the scanning counter 16 is A, and the values of the target value registers 17 and 18 are B and C, respectively, the comparators 19 and 20 turn ON when $A<B$ and $A<C$, and turn OFF when $A \geq B$ and $A \geq C$. Therefore, for example, the comparator 19 forms a pulse which is ON during the scanning period when the value A of the scanning counter 16 is in the condition $0<A<B$, and is OFF during the scanning period when $B \leq A \leq$ (full count). This is the same for the comparator 20. This enables the performance control pulse having the desired pulse duty, as explained with respect to FIGS. 3A and 3B, to be formed.

With respect to the AND circuits 21 and 22, only one of the two is placed in the operation enable state, by the problem mode signal from the service processor 15 (and it is reversed by supervisor mode signal), in a state wherein the performance adjust mode signal is set at ON when the performance of the information processing apparatus is adjusted. Therefore, the outputs of the comparators 19 and 20 are selected set by an AND circuit (one of 21 and 22) which is in the operation enable state, and the performance control pulse is then sent to the execution control portion 14. The execution control portion 14 stops the instruction fetch operation by, for example, interlocking the address cycle of the pipe line. The fetch of the instruction (prefetch) is also usually carried out during such an interlock; the setting is such that this operation is also inhibited. Further, many other circuit means exist in which the pulse duty used for forming the performance control pulse according to the present invention can be varied, in addition to the counter or the comparator shown in FIG. 4, and these can be suitably selected and used when necessary. Of course, it is clear that this process can be also carried out by software means.

Figure 5A:
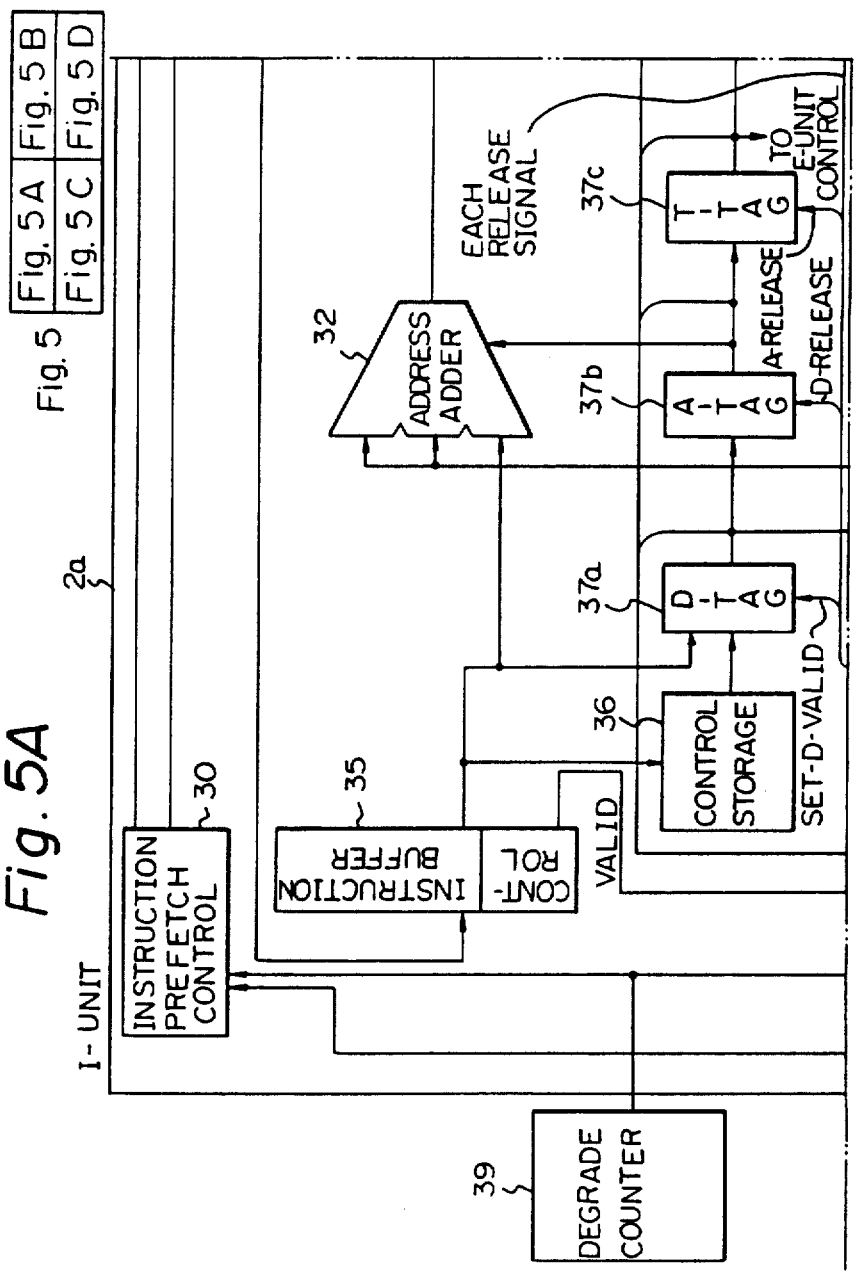
Figure 5B:
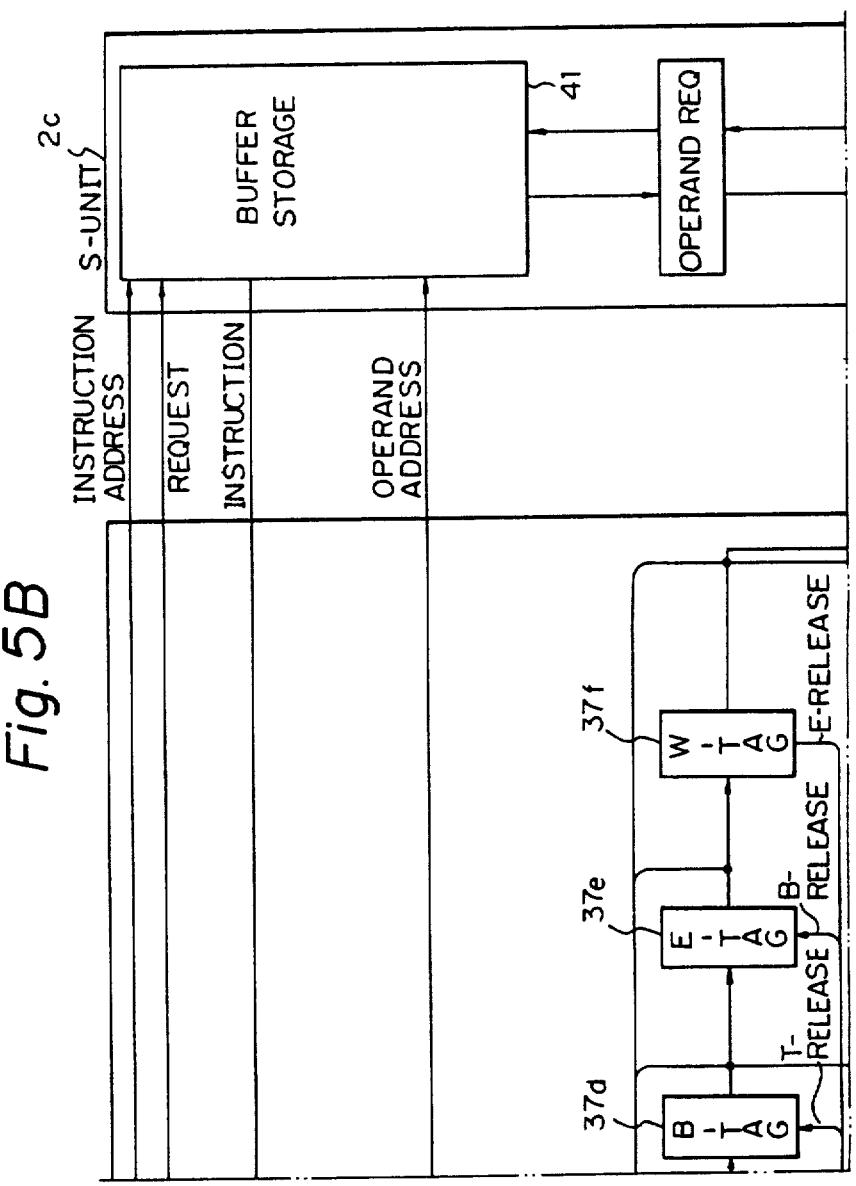
Figure 5C:
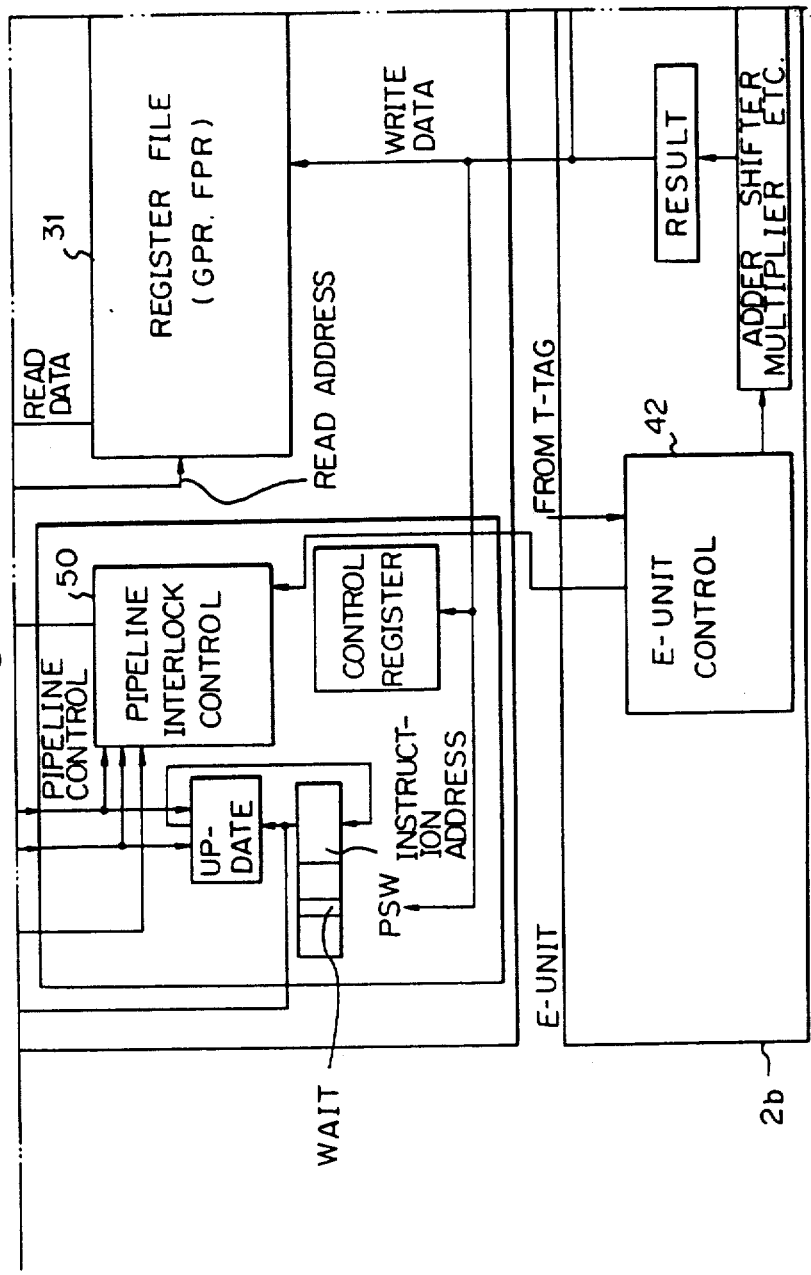

FIG. 5 shows a relationship between the instruction unit 2a (I-unit), the execution unit 2b (E-unit), and the storage unit 2c (S-unit), in which the I-unit 2a is the central element.

There are six pipe line stages: D, A, T, B, E and W. Each stage is explained as follows:

D is the stage in which the machine instruction is decoded and a register file 31 is read out for calculation of the operand;

A is the stage in which the calculation of the operand address is carried out by an address adder 32;

T is the stage in which the calculated operand address is sent to the S unit (2c), to access a buffer storage 41, and the control information is sent to the E unit (2b);

B is the stage in which the operand data is read out from the buffer or the register file 31;

E is the stage in which the calculation is carried out in the E unit (2b); and

W is the stage in which the result of the calculation is written into the register file 31.

The preferred embodiment of the present invention is a pipeline system controlled by a microprogram. The machine instruction fetched from the S unit enters an instruction buffer 35, and a control storage is accessed by a machine instruction thereof, so that the microinstruction (also called TAG) is read out. This operation propagates each of the TAG registers 37a-37f of D, A, ..., W at every cycle, and one microinstruction is processed via each stage of D, A, ..., W. One machine instruction is processed by one or a plurality of microinstructions in accordance with the kind thereof.

Figures 6, 6A:
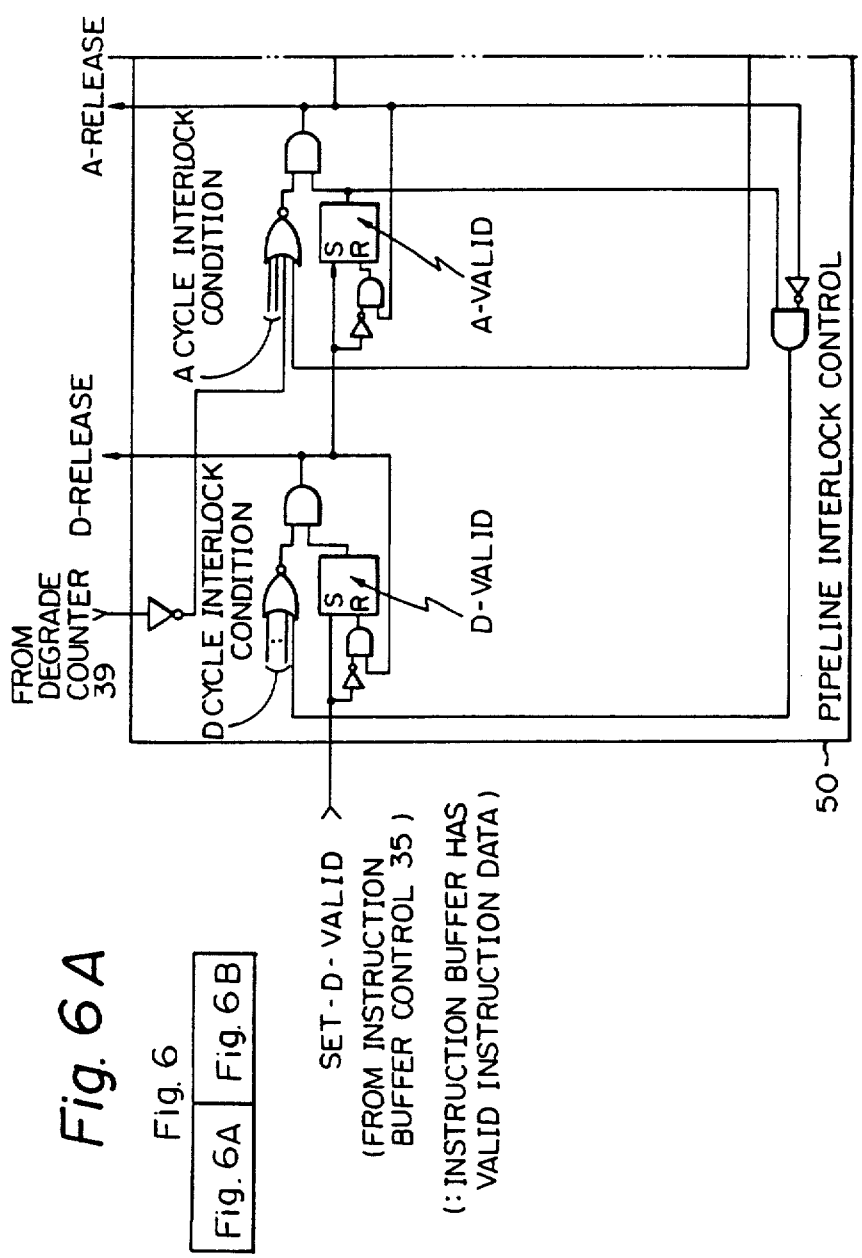
FIG. 6 represents the arrangements of FIGS. 6A and 6B.
FIGS. 6A and 6B are block circuit diagrams of a circuit for producing a release signal for each TAG register shown in FIG. 5.
Figure 6B:
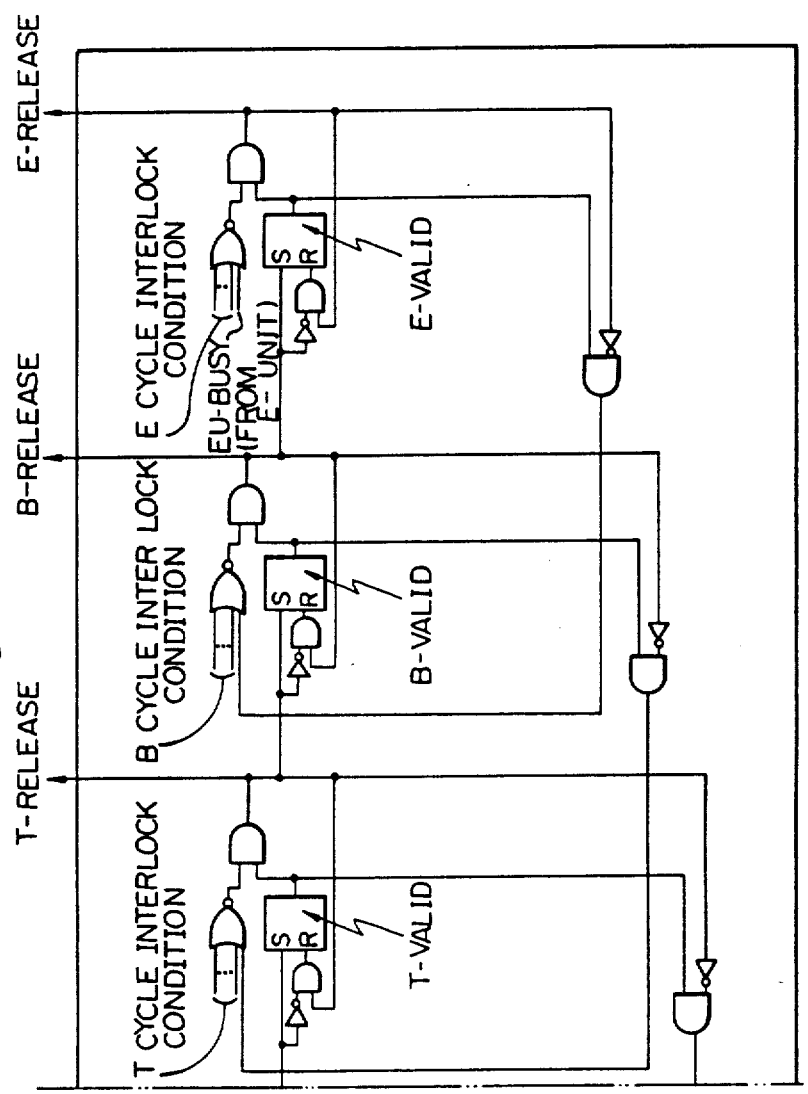

The propagation between the TAG registers is controlled by release signals, as shown in FIG. 6. For example, one microcommand is propagated from the D TAG register to the A TAG register and a next microcommand is read to the D TAG register. Therefore, usually, different microcommands are stored in each TAG register, and the hardware for each TAG is operated by a different instruction (that is, a register file 31 for D, an address adder 32 for A, the S unit (2c) and E unit control 42 for T, the S unit and a register file 31 for B; the E unit (2c) for E, and a register file 31 for W). This control is well known, and is called pipeline control. Further, reference numerals 11 and 14 in FIG. 4 correspond to the reference numerals 39 and 50 in FIG. 5, respectively.

FIG. 6 is a circuit for forming a release signal for each TAG register. Each TAG register receives the release signal as an enable signal. For example, when the T TAG register receives the A-release signal as the set enable signal, the microcommand in the A TAG register stored immediately before that time is loaded into the T TAG register.

The release signal forming portion in each stage has a similar construction, and generates a release signal when no interlock signal exists and a valid flag is set. The release signal in a certain stage sets the valid flag in the next stage. When the interlock condition does not exist in the next stage, the release signal in the next stage is generated. The operation is carried out in a domino manner, i.e., one after the other is sequence. When the valid flag is reset in the former stage, the release signal thereof is also turned OFF, then the valid flag in the next stage also turns OFF, and thus the release signal in the next stage turns OFF; this operation is also carried out in a domino manner, as above.

When the interlock condition exists in a certain stage, if the valid flag is set, a release signal is not generated. Therefore, the feedback signal to the former stage turns ON, and this becomes an interlock condition in the former stage. Next, in the stage before the stage wherein the interlock condition exists, all release signals are inhibited.

When the first interlock condition is released, a release signal is generated in the next stage, and as a result, the feedback signal to the former stage turns OFF. Accordingly, the inhibition for the release signal in the former stage is also released.

Concrete examples of the interlock condition in each stage are explained as follows:

D—when the content of the register written in the former instruction is used for calculation of the operand address in the present instruction;

A—when the buffer is accessed, the data to be searched is not in the buffer and access to the main storage unit is required.

In an embodiment of the present invention, since one of the interlock conditions is in the A stage, the inverted output of a degrade counter 39 is used to accomplish the interlock. The degrade counter corresponds to the performance control generating portion 11 while the prefetch control 30 and the interlock control 50 corresponding to the execution control portion 14.

Figure 7:
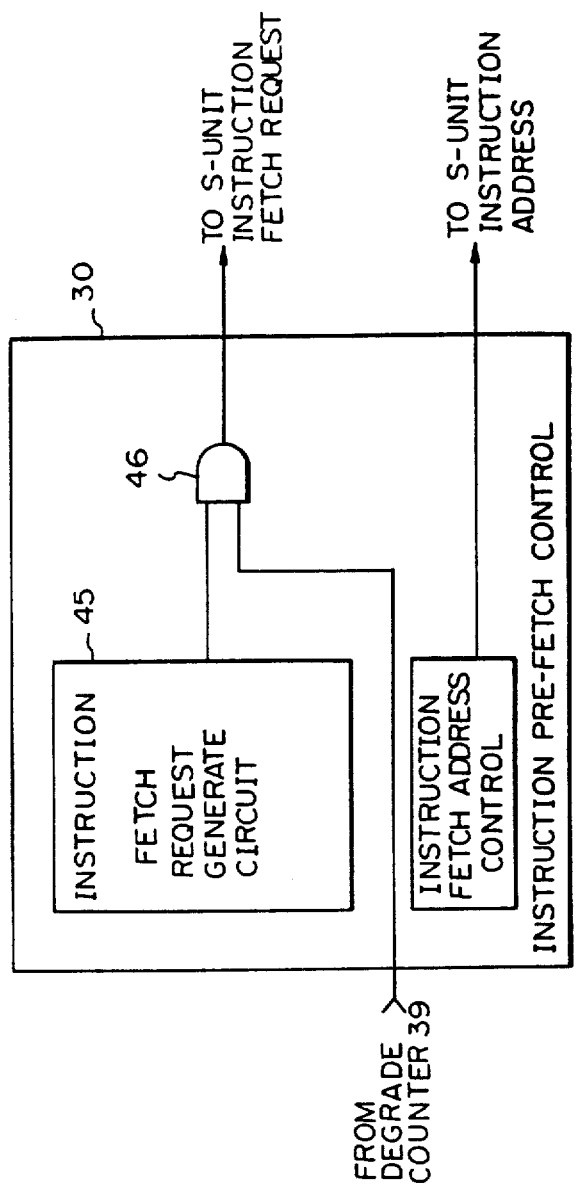
FIG. 7 is a block diagram of a circuit of an instruction prefetch circuit control portion shown in FIG. 6.

FIG. 7 shows details of the instruction pre-fetch control portion 30 shown in FIG. 5. As can be seen in the figure, a prefetch request is generated by fetch request generate circuit should be gated by the output of the degrade counter 39. This inhibiting of the prefetch request is not always necessary for the present invention, however, it is preferable to control the prefetch function using the degrade counter signal to ensure an exact coincidence of the apparatus performance and the target performance.

Figure 8A:

FIG. 8 including 8A–8C is a graph and tables of the process of the instruction fetch inhibit by the degrade counter signal. In FIGS. 8, 8(a) is a time chart for when the degrade counter 39 stops the clock pulse FIG. 8(b) shows that, in the processing of an instruction which requires communication with an external device, for example, a channel processor of the prior art, the channel processor cannot be stopped, and thus the process cannot be effectively carried out. However, in the present invention, as shown in FIG. 8(c), when the degraded counter signal turns OFF, only instruction operations entered in the A stage at that time are interlocked, and instruction operations already subsequent to the T stage are carried out, and thus no problem arises.

As mentioned above, according to the present invention, the performance can be properly adjusted over a wide range by providing only a simple circuit means in the information processing apparatus. Further, this decreases the cost of the information processing apparatus and the usual maintenance and management problems.

What is claimed is:

1. A system for adjusting performance of an information processing apparatus, having a plurality of states including a wait and a stop state and operating in a problem program mode having a first target performance value and a supervisor program mode having a second target performance value, comprising:

means for providing a target performance value having a service mode processor providing the first and second target performance values;

means for receiving clock pulses and for generating a performance control pulse based on said clock pulses and having a pulse width and a pulse period in accordance with the selected target value, a ratio of the pulse width and the pulse period of the performance control pulse coinciding with the target performance value, said means for receiving clock pulses and for generating a performance control pulse comprising:

means for generating a first corresponding performance control pulse when said information processing apparatus is in the problem program mode and a second corresponding performance control pulse when said information processing apparatus is in the supervisor program mode;

scanning counter means for counting said clock pulses, for storing a counted value of said clock pulses, and for incrementing the counted value except when said information processing apparatus is in the wait or the stop state;

a problem mode target value register connected to said service mode processor and loaded with the first target performance value of the problem program mode, by said service mode processor;

a supervisor mode target value register connected to said service mode processor and loaded with the second target performance value of the supervisor mode, first comparator means, connected to said scanning counter means and said problem mode target value register, for constantly comparing the value in said problem mode target value register with the counted value in said scanning counter means and producing a first output signal;

second comparator means, connected to said scanning counter means and said supervision mode target value register, for constantly comparing the set value in said supervisor mode target value register with the counted value in said scanning counter means and producing a second output;

a first AND gate connected to receive the first signal output from said first comparator means and a problem mode signal;

a second AND gate connected to receive the second output of said second comparator means and an inverted problem mode signal, and a supervisor mode signal; and means for coupling said first and said second AND gates to said execution control means; and execution control means for alternately setting an execution period and an execution inhibiting period in accordance with the performance control pulse.

2. A system according to claim 1, wherein when said problem mode target value register is set to a value B and when the counted value of said scanning counter is a value A, said first comparator turns ON when $0 < A < B$ and turns OFF when $B \leq A \leq$ (full count).

3. A system according to claim 1, wherein when said supervisor mode target value register is set to a value C and when the counted value of said scanning counter is a value A, said second comparator turns ON when $0 < A < C$ and turns OFF when $C \leq A \leq$ (full count).

4. A system for adjusting performance of an information processing apparatus, having a plurality of states including a wait and a stop state and operating in a problem program mode having a first target performance value and a supervisor program mode having a second target performance value, comprising:

means for providing a selected target performance value, having a service mode processor providing the first and the second target performance values;

means for generating a performance control pulse having a pulse width and a pulse period varying in accordance with the selected target performance value, a ratio of the pulse width and the pulse period of the performance control pulse coinciding with the selected target performance value, said means for generating a performance control pulse comprising:

means for generating a first corresponding performance control pulse when said information processing apparatus is in the problem program mode and a second corresponding performance control pulse when said information processing apparatus is in the supervision program mode;

scanning counter means for incrementing a counted value except when said information processing apparatus is in the wait or the stop state;

problem mode target value register means, connected to said service mode processor, for receiving and storing the first target performance value of the problem program mode, from said service mode processor;

supervisor mode target value register means, connected to said service mode processor, for receiving and storing the second target performance value, from said service mode processor;

first comparator means, connected to said scanning counter means and to said problem mode target value register means, for constantly comparing the value in said problem mode target value register means with the counted value of said scanning counter means and for producing a first output signal;

second comparator means, connected to said scanning counter means and to said supervision mode target value register means, for constantly comparing the set value in said supervisor mode target value register means with the counted value of said scanning counter means and for producing a second output;

a first AND gate connected to receive the first signal output from said first comparator and a problem mode signal;

a second AND gate connected to receive the second output of said second comparator and an inverted problem mode signal, and a supervisor mode signal; and means for coupling said first and said second AND gates to said execution control means; and execution control means for alternately setting an execution period and an execution inhibiting period in accordance with the performance control pulse, so that when said problem mode target value register means stores a value B and when the counted value of said scanning counter means corresponds to a value A, said first comparator means turns ON when $0 < A < B$ and turns OFF when $B \leq A \leq$ (full count).

5. A system for adjusting performance of an information processing apparatus, having a plurality of states including a wait and a stop state and operating in a problem program mode having a first target performance value and a supervisor program mode having a second target performance value, comprising:

means for providing a selected target performance value, having a service mode processor providing the first and the second target performance values;

means for generating a performance control pulse having a pulse width and a pulse period varying in accordance with the selected target performance value, a ratio of the pulse width and the pulse period of the performance control pulse coinciding with the selected target performance value, said means for generating a performance control pulse comprising:

means for generating a first corresponding performance control pulse when said information processing apparatus is in the problem program mode and a second corresponding performance control pulse when said information processing apparatus is in the supervision program mode;

scanning counter means for incrementing a counted value except when said information processing apparatus in in the wait or the stop state;

problem mode target value register means, connected to said service mode processor, for receiving and storing the first target performance value of the problem program mode, from said service mode processor;

supervisor mode target value register means, connected to said service mode processor, for receiving and storing the second target performance value, from said service mode processor;

first comparator means, connected to said scanning counter means and to said problem mode target value register means, for constantly comparing the value in said problem mode target value register means with the counted value of said scanning counter means and for producing a first output signal;

second comparator means, connected to said scanning counter means and to said supervision mode target value register means, for constantly comparing the set value in said supervisor mode target value register means with the counted value of said scanning counter means and for producing a second output;

a first AND gate connected to receive the first signal output from said first comparator and a problem mode signal;

a second AND gate connected to receive the second output of said second comparator and an inverted problem mode signal, and a supervisor mode signal; and means for coupling said first and said second AND gates to said execution control means; and execution control means for alternately setting an execution period and an execution inhibiting period in accordance with the performance control pulse so that when said supervisor mode target value register means stores a value C and when the counted value of said scanning counter means corresponds to a value A, said second comparator means turns ON when $0 < A < C$ and turns OFF when $C \leq A \leq$ (full count).

* * * * *